United States Patent
Chang

(10) Patent No.: US 8,832,358 B2
(45) Date of Patent: Sep. 9, 2014

(54) DATA WRITING METHOD, MEMORY CONTROLLER AND MEMORY STORAGE APPARATUS

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 187 days.

(21) Appl. No.: 13/490,475

(22) Filed: Jun. 7, 2012

(65) Prior Publication Data

US 2013/0246687 A1    Sep. 19, 2013

(30) Foreign Application Priority Data

Mar. 14, 2012 (TW) .............................. 101108654 A

(51) Int. Cl.
*G06F 12/00* (2006.01)

(52) U.S. Cl.
USPC .................. 711/103; 365/185.03; 365/185.33

(58) Field of Classification Search
CPC ..................... G06F 12/0246; G06F 2212/1032; G06F 12/0802; G06F 12/02; G06F 2212/1016; G06F 2212/7202; G11C 16/105; G11C 16/3418; G11C 2211/5646; G11C 11/5628; G11C 11/5643; G11C 16/04; G11C 29/82

USPC .................. 711/103, 185.33; 365/185.03
See application file for complete search history.

(56) References Cited

U.S. PATENT DOCUMENTS

| | | | |
|---|---|---|---|
| 8,046,528 B2 * | 10/2011 | Chu et al. ...................... | 711/103 |
| 2006/0215450 A1 * | 9/2006 | Honma et al. ........... | 365/185.03 |
| 2012/0239861 A1 * | 9/2012 | Lee et al. ...................... | 711/103 |

* cited by examiner

Primary Examiner — Hashem Farrokh
(74) Attorney, Agent, or Firm — Jianq Chyun IP Office

(57) ABSTRACT

A data writing method for writing data into a physical block of a rewritable non-volatile memory module is provided. The method includes setting danger distance respectively corresponding to each of the physical pages of the physical block, and setting a secure writing flag in an enable state in response to a secure write command. The method also includes determining whether the secure writing flag is set in the enable state when receiving a write command and updated data thereof; if no, writing the updated data into a predetermined physical page of the physical block; if yes, writing the updated data into a secure physical page of the physical block and re-setting the secure writing flag in a disable state, and the distance between the secure physical page and the predetermined physical page is equal to the danger distance corresponding to the predetermined physical page.

20 Claims, 11 Drawing Sheets

| Address of lower physical page | Address of upper physical page | |
|---|---|---|
| 0 | 4 | 900(0) |
| 1 | 5 | 900(1) |
| 2 | 8 | 900(2) |
| 3 | 9 | 900(3) |
| 6 | 12 | 900(4) |
| 7 | 13 | 900(5) |
| 10 | 16 | 900(6) |
| 11 | 17 | 900(7) |
| 14 | 20 | 900(8) |
| ⋮ | ⋮ | ⋮ |
| 110 | 116 | 900(56) |
| 111 | 117 | 900(57) |
| 114 | 120 | 900(58) |
| 115 | 121 | 900(59) |
| 118 | 124 | 900(60) |
| 119 | 125 | 900(61) |
| 122 | 126 | 900(62) |
| 123 | 127 | 900(63) |

| Physical page number | Secure physical page number | Danger distance |
|---|---|---|
| 0 | 0 | 0 |
| 1 | 1 | 0 |
| 2 | 2 | 0 |
| 3 | 3 | 0 |
| 4 | 6 | 2 |
| 5 | 6 | 1 |
| 6 | 6 | 0 |
| 7 | 10 | 3 |
| 8 | 10 | 2 |
| 9 | 10 | 1 |
| 10 | 10 | 0 |
| 11 | 14 | 3 |
| 12 | 14 | 2 |
| 13 | 14 | 1 |
| 14 | 14 | 0 |
| 15 | 18 | 3 |
| 16 | 18 | 2 |
| 17 | 18 | 1 |
| 18 | 18 | 0 |
| 19 | 22 | 3 |
| 20 | 22 | 2 |
| 21 | 22 | 1 |
| 22 | 22 | 0 |
| ⋮ | ⋮ | ⋮ |

DATA WRITING METHOD, MEMORY CONTROLLER AND MEMORY STORAGE APPARATUS

CROSS-REFERENCE TO RELATED APPLICATION

This application claims the priority benefit of Taiwan application serial no. 101108654, filed on Mar. 14, 2012. The entirety of the above-mentioned patent application is hereby incorporated by reference herein and made a part of this specification.

BACKGROUND

1. Technology Field

The present invention relates to a data writing method for a rewritable non-volatile memory module, and a memory controller and a memory storage apparatus using the same.

2. Description of Related Art

Digital cameras, mobile phones, and MP3 music players have undergone rapid growth in recent years, so that consumer demand for storage media has also drastically increased. Since a rewritable non-volatile memory has the characteristics of non-volatility of data, low power consumption, small volume, non-mechanical structure, and fast reading and writing speed, the rewritable non-volatile memory is the most adaptable memory to be applied in a portable electronic product, e.g., a notebook computer. A conspicuous solid state drive (SSD) is a storage apparatus which utilizes a flash memory as its storage medium. Therefore, the flash memory industry has become a very popular part of the electronic industry in recent years.

With the development of semiconductor manufacturing technology, a multi level cell (MLC) NAND flash memory module has been extensively applied. Due to the physical properties of the MLC NAND flash memory, when some physical pages are programmed, charges are rather unstable, and other physical pages adjacent to the programmed physical pages may be affected. For instance, in a 4-level flash memory module, each physical block has a plurality of physical pages, and the physical pages may be categorized into a plurality of lower physical pages and a plurality of upper physical pages respectively corresponding to the lower physical pages, wherein each of the upper physical pages corresponds to one of the lower physical pages. Namely, memory cells on the same word line constitute a physical page set that contains one lower physical page and one upper physical page. The speed of writing data into the lower physical page is faster than the speed of writing data into the upper physical page; therefore, the lower physical page is defined as a fast physical page, while the upper physical page is defined as a slow physical page. Particularly, while the upper physical page is being programmed, given that there is a program failure, the data stored in the lower physical page corresponding to the programmed upper physical page may be lost. Hence, compared to a single level cell (SLC) NAND flash memory module, the MLC NAND flash memory module has relatively large capacity, whereas the reliability of the MLC NAND flash memory module is worse.

In some particular application, the data reliability need be specially ensured. For instance, in a case where the MLC NAND flash memory module is integrated into a smart card for capacity expansion, if a file is unsuccessfully written in an address and such failure leads to loss of files stored in other addresses, the reliability of the smart card will be questioned and the smart card can not be accepted by a user.

Accordingly, it is necessary to develop a data writing method that can enhance the reliability of an MLC NAND flash memory module.

SUMMARY

Accordingly, the present invention is directed to a data writing method and a memory controller capable of effectively improving the reliability of writing data into a rewritable non-volatile memory module.

The present invention is further directed to a memory storage apparatus capable of reliably storing data.

According to an exemplary embodiment of the present invention, a data writing method for writing data into a physical block of a rewritable non-volatile memory module is provided. The physical block has a plurality of physical page sets, each of the physical page sets has a plurality of physical pages, the physical pages includes a lower physical page and an upper physical page, and the speed of writing data into the lower physical pages is faster than the speed of writing data into the upper physical pages. The data writing method includes setting danger distance respectively corresponding to each of the physical pages of each of the physical page sets. The data writing method also includes receiving a secure write command and setting a secure writing flag in an enable state in response to the secure write command. The data writing method also includes receiving a write command and updated data corresponding to the write command; identifying a predetermined physical page of the physical pages of the physical page sets; determining whether the secure writing flag is set in the enable state. The data writing method also includes, if the secure writing flag is set in the enable state, writing the updated data into a secure physical page of the physical pages of the physical page sets in response to the write command and re-setting the secure writing flag in a disable state, wherein a distance between the secure physical page and the predetermined physical page in the physical block is equal to the danger distance corresponding to the predetermined physical page. The data writing method further includes, if the secure writing flag is not set in the enable state, writing the updated data into the predetermined physical page of the physical pages in response to the write command.

According to another exemplary embodiment of the present invention, a memory controller for controlling a rewritable non-volatile memory module is provided, wherein the rewritable non-volatile memory module has a plurality of physical blocks, each of the physical blocks has a plurality of physical page sets, each of the physical page sets has a plurality of physical pages, the physical pages includes a lower physical page and an upper physical page, and the speed of writing data into the lower physical pages is faster than the speed of writing data into the upper physical pages. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface and configured to set danger distance respectively corresponding to each of the physical pages of the physical page sets of the physical blocks. Besides, the memory management circuit is configured to receive a secure write command and set a secure writing flag in an enable state in response to the secure write command. The memory management circuit is also configured to receive a write command and updated data corresponding to the write command and identify a predetermined physical page of the physical pages of the physical page sets in a target physical block of the physical blocks. The memory management circuit also determines whether the secure writing flag is set in the enable state. If the secure writing flag is set in the enable state, the memory management circuit is configured to write the updated data into a secure physical page of the physical pages of the physical page sets in the target physical block in response to the write command and re-set the secure writing flag in a disable state, wherein a distance between the secure physical page and the predetermined physical page in the target physical block is equal to the danger distance corresponding to the predetermined physical page. If the secure writing flag is not set in the enable state, the memory management circuit is configured to write the updated data into the predetermined physical page in response to the write command.

According to still another exemplary embodiment of the present invention, a memory storage apparatus is provided. The memory storage apparatus includes a rewritable non-volatile memory module, a memory controller, and a connector configured to couple to a host system. The rewritable non-volatile memory module has a plurality of physical blocks, each of the physical blocks has a plurality of physical page sets, each of the physical page sets has a plurality of physical pages, the physical pages includes a lower physical page and an upper physical page, and the speed of writing data into the lower physical pages is faster than the speed of writing data into the upper physical pages. The memory controller is coupled to the rewritable non-volatile memory module and the connector, and configured to set danger distance respectively corresponding to each of the physical pages of the physical page sets of the physical blocks. Besides, the memory controller is configured to receive a secure write command and set a secure writing flag in an enable state in response to the secure write command. The memory controller is configured to receive a write command and an updated data corresponding to the write command and identify a predetermined physical page of the physical pages of the physical page sets in a target physical block of the physical blocks. The memory controller is configured to determine whether the secure writing flag is set in the enable state. If the secure writing flag is set in the enable state, the memory controller is configured to write the updated data into a secure physical page of the physical pages of the physical page sets in the target physical block in response to the write command and re-set the secure writing flag in a disable state, wherein a distance between the secure physical page and the predetermined physical page in the target physical block is equal to the danger distance corresponding to the predetermined physical page. If the secure writing flag is not set in the enable state, the memory controller is configured to write the updated data into the predetermined physical page in response to the write command.

Based on the above, by applying the data writing method, the memory controller, and the memory storage apparatus described in the exemplary embodiments of the present invention, the data can be reliably written, so as to prevent data loss caused by the program failure.

It should be understood, however, that this summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

FIG. 10 is a schematic view illustrating a danger distance table corresponding to physical pages of a physical block according to an exemplary embodiment of the present invention.

DESCRIPTION OF THE EMBODIMENTS

Figure 1A:
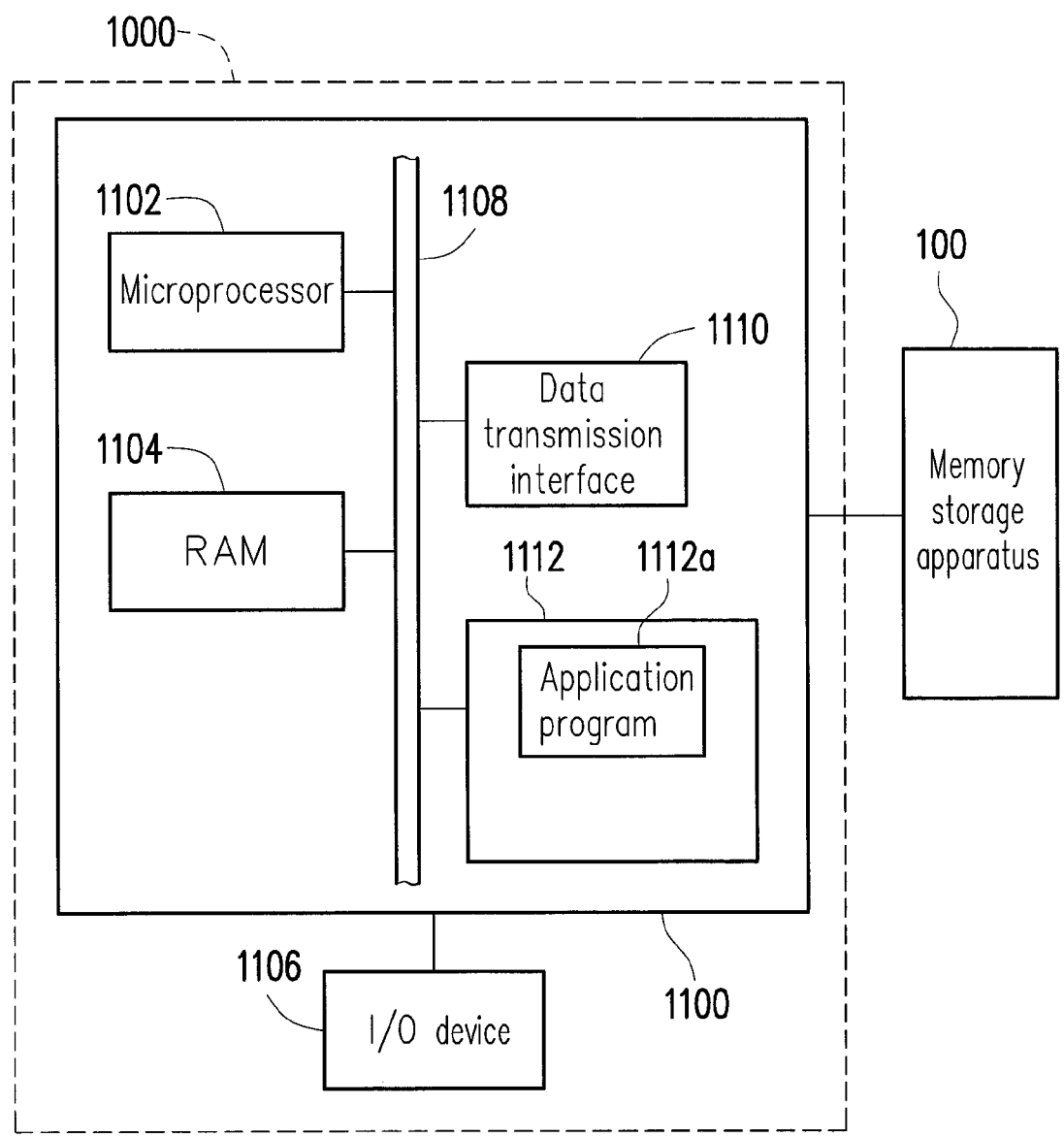
FIG. 1A illustrates a host system using a memory storage apparatus according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings; As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (i.e., a memory storage system) typically includes a rewritable non-volatile memory module and a controller (i.e., a control circuit). The memory storage apparatus is usually used together with a host system, such that the host system may write data into or read data from the memory storage apparatus.

FIG. 1A illustrates a host system using a memory storage apparatus according to an exemplary embodiment of the present invention.

Figure 1B:
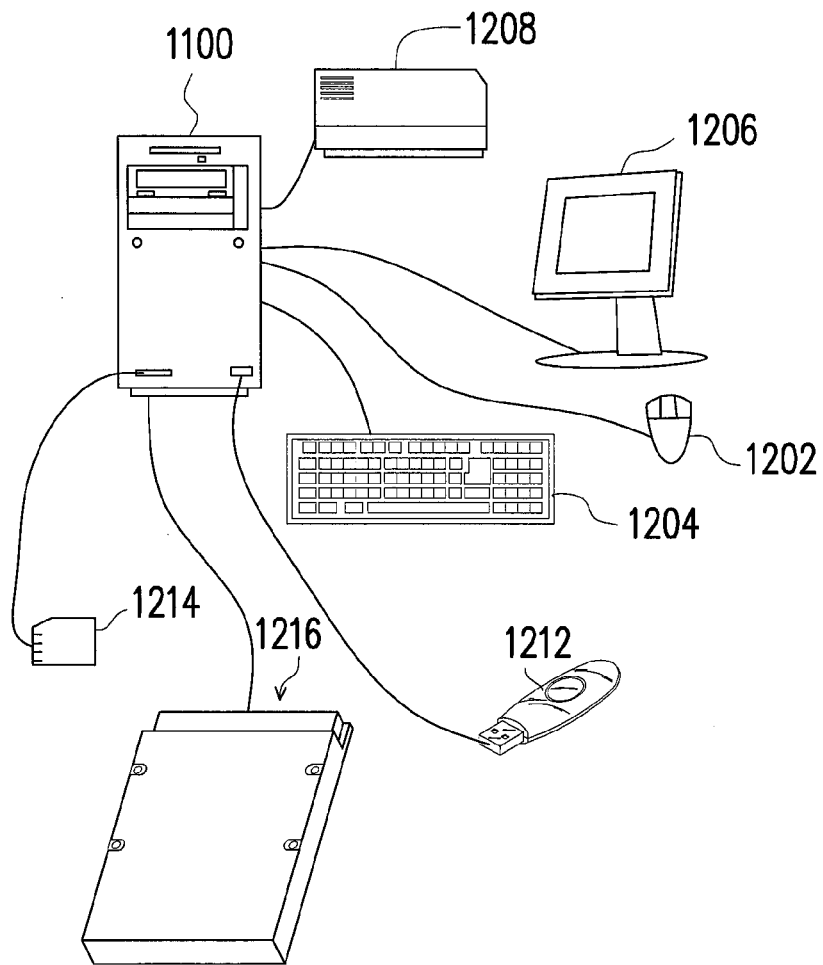
FIG. 1B schematically illustrates a computer, an input/output (I/O) device, and a memory storage apparatus according to an exemplary embodiment of the present invention.

With reference to FIG. 1A, a host system 1000 includes a computer 1100 and an input/output (I/O) device 1106. The computer 1100 includes a microprocessor 1102, a random access memory (RAM) 1104, a system bus 1108, a data transmission interface 1110, and a built-in storage apparatus 1112. The I/O device 1106 includes a mouse 1202, a keyboard 1204, a display 1206, and a printer 1208 as shown in FIG. 1B. Note that the devices depicted in FIG. 1B should not be construed as limitations to the present invention, and the I/O device 1106 may include other devices as well.

In the exemplary embodiment of the present invention, the memory storage apparatus 100 is coupled to other devices of the host system 1000 through the data transmission interface 1110. By using the microprocessor 1102, the RAM 1104, the I/O device 1106, and an application program 1112a installed in the built-in storage apparatus 1112, the data may be written into or read from the memory storage apparatus 100. For instance, the memory storage apparatus 100 may be a rewritable non-volatile memory storage apparatus, such as a flash drive 1212, a memory card 1214, or a solid state drive (SSD) 1216 as shown in FIG. 1B.

Figure 1C:
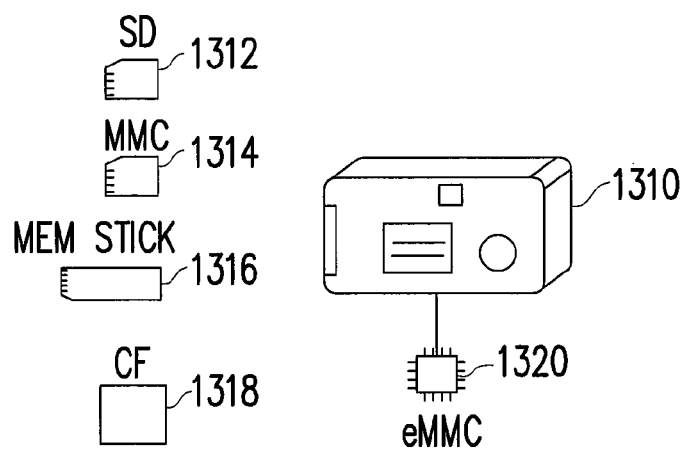
FIG. 1C schematically illustrates a host system and a memory storage apparatus according to another exemplary embodiment of the present invention.

Generally, the host system 1000 may substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so forth. For instance, if the host system is a digital camera (video camera) 1310, the rewritable non-volatile memory storage apparatus is an SD card 1312, an MMC 1314, a memory stick 1316, a CF card 1318, or an embedded storage apparatus 1320 (as shown in FIG. 1C). The embedded storage device 1320 includes an embedded MMC (eMMC). It should be mentioned that the eMMC is directly coupled to the substrate of the host system.

Figure 2:
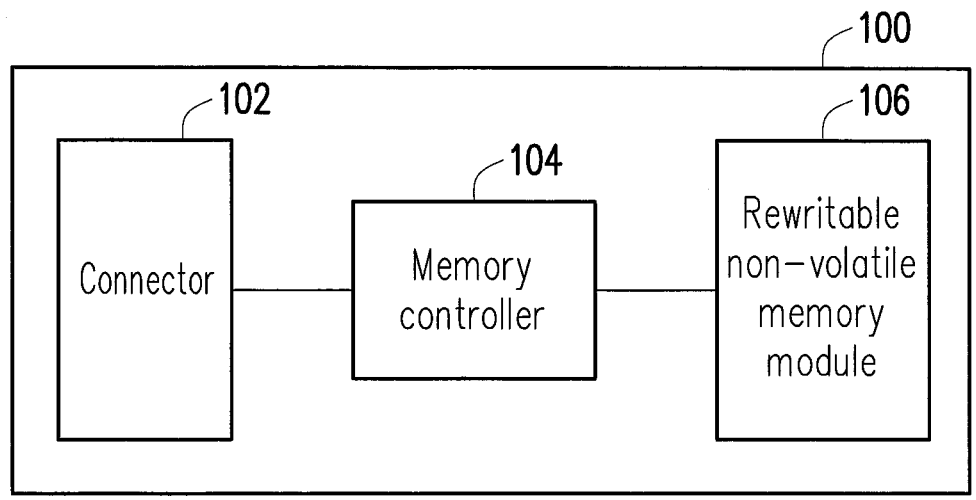
FIG. 2 is a schematic block diagram illustrating the memory storage apparatus depicted in FIG. 1A.

FIG. 2 is a schematic block diagram illustrating the memory storage apparatus depicted in FIG. 1A.

With reference to FIG. 2, the memory storage apparatus 100 includes a connector 102, a memory controller 104, and a rewritable non-volatile memory module 106.

In the present exemplary embodiment, the connector 102 complies with the secure digital (SD) standard. However, the present invention is not limited thereto, and the connector 102 may also comply with the Institute of Electrical and Electronic Engineers (IEEE) 1394 standard, the parallel advanced technology attachment (PATA) standard, the peripheral component interconnect (PCI) express standard, the universal serial bus (USB) standard, the serial advanced technology attachment (SATA) standard, the memory stick (MS) standard, the multi media card (MMC) standard, the compact flash (CF) standard, the integrated device electronics (IDE) standard, or other suitable standards.

The memory controller 104 is configured to execute a plurality of logic gates or control instructions implemented in a form of hardware or firmware and performing various data operations in the rewritable non-volatile memory module 106 according to commands issued by the host system 1000, such as data writing, reading, erasing, merging, and so on.

The rewritable non-volatile memory module 106 is coupled to the memory controller 104 and has a plurality of physical blocks for storing data written by the host system 1000. According to this exemplary embodiment, each of the physical blocks has a plurality of physical pages, and the physical pages belonging to the same physical block may be written individually and must be erased simultaneously.

In detail, each of the physical blocks is the smallest unit for erasing data. Namely, each of the physical blocks contains the least number of memory cells which are erased all together. Each of physical pages is the smallest unit for programming data. Namely, each of the physical pages is the smallest unit for updating data. However, it should be understood that in another exemplary embodiment, the smallest unit for updating data may be one sector or other size. Each physical page usually includes a data bit area and a redundant bit area. The data bit area is used for storing user data, and the redundant bit area is used for storing system data (e.g., error checking and correcting (ECC) codes).

In the present exemplary embodiment, the rewritable non-volatile memory module 106 is a multi level cell (MLC) NAND flash memory module. However, the present invention is not limited thereto, and the rewritable non-volatile memory module 106 may also be a trinary level cell (TLC) NAND flash memory module or any other memory module having the same characteristics.

Figure 3:
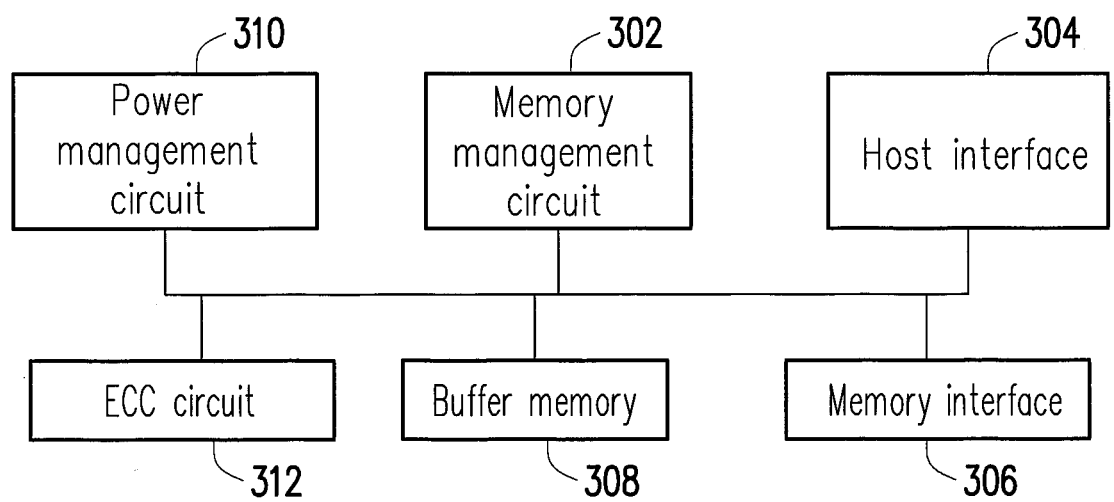
FIG. 3 is a schematic block diagram illustrating a memory controller according to an exemplary embodiment of the present invention.

FIG. 3 is a schematic block diagram illustrating a memory controller according to an exemplary embodiment of the present invention. Note that the memory controller depicted in FIG. 3 is merely exemplary and should not be construed as a limitation to the present invention.

With reference to FIG. 3, the memory controller 104 includes a memory management circuit 302, a host interface 304, a memory interface 306, a buffer memory 308, a power management circuit 310, and an error checking and correcting (ECC) circuit 312.

The memory management circuit 302 is configured to control the overall operation of the memory controller 104. Specifically, the memory management circuit 302 has a plurality of control instructions, and when the memory storage apparatus 100 operates, these control instructions are executed to write, read, and erase data.

In the present exemplary embodiment, the control instructions executed by the memory management circuit 302 are implemented in a form of firmware. For example, the memory management circuit 302 has a micro-processing unit (not shown) and a read-only memory (not shown), and these control instructions are burned into the read-only memory. When the memory storage apparatus 100 operates, these control instructions are executed by the micro-processing unit to perform operations of writing, reading and erasing data.

Besides, in another exemplary embodiment of the present invention, the control instructions of the memory management circuit 302 may also be stored in a specific area of the rewritable non-volatile memory module 106 (e.g., in a system area exclusively used for storing system data in a the rewritable non-volatile memory module) as program codes. Moreover, the memory management circuit 302 has a micro-processing unit (not shown), a read-only memory (not shown), and a random access memory (RAM) (not shown). Particularly, the read-only memory has boot codes, and when the memory controller 104 is enabled, the micro-processing unit first runs the boot codes to load the control instructions stored in the rewritable non-volatile memory module 106 to the RAM of the memory management circuit 302. After that, the micro-processing unit executes these control instructions to perform operations of writing, reading and erasing data.

Moreover, in another exemplary embodiment of the present invention, the control instructions of the memory management circuit 302 may also be implemented in a hardware form. For instance, the memory management circuit 302 includes a microprocessor, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller 302. The memory cell management circuit is configured to manage the physical blocks of the rewritable non-volatile memory module 106. The memory writing circuit is configured to issue a write command to the rewritable non-volatile memory module 106, so as to write data into the rewritable non-volatile memory module 106. The memory reading circuit is configured to issue a read command to the rewritable non-volatile memory module 106, so as to read data from the rewritable non-volatile memory module 106. The memory erasing circuit is configured to issue an erase command to the rewritable non-volatile memory module 106, so as to erase data from the rewritable non-volatile memory module 106. The data processing circuit is configured to process data to be written into the rewritable non-volatile memory module 106 and data to be read from the rewritable non-volatile memory module 106.

The host interface 304 is coupled to the memory management circuit 302 and configured to receive and identify commands and data transmitted by the host system 1000. In the present exemplary embodiment, the host interface 304 complies with the SD standard. However, the present invention is not limited thereto, and the host interface 304 may also comply with the PATA standard, the IEEE 1394 standard, the PCI Express standard, the USB standard, the SATA standard, the MS standard, the MMC standard, the CF standard, the IDE standard, or any other appropriate data transmission standard.

The memory interface 306 is coupled to the memory management circuit 302 and configured to access the rewritable non-volatile memory module 106. Namely, data to be written into the rewritable non-volatile memory module 106 is converted by the memory interface 306 into a format acceptable to the rewritable non-volatile memory module 106.

The buffer memory 308 is coupled to the memory management circuit 302 and configured to temporarily store data and commands received from the host system 1000 or data received from the rewritable non-volatile memory module 106. For instance, the buffer memory 308 may be a static random access memory (SRAM), a dynamic random access memory (DRAM), and so forth.

The power management circuit 310 is coupled to the memory management circuit 302 and configured to control the power of the memory storage apparatus 100.

The ECC circuit 312 is coupled to the memory management circuit 302 and configured to execute an error checking and correcting procedure to ensure data accuracy. Specifically, when the host interface 304 receives a write command from the host system 1000, the ECC circuit 212 generates an error checking and correcting (ECC) code for data (i.e., the updated data) corresponding to the write command, and the memory management circuit 302 writes the updated data and the corresponding ECC code into the rewritable non-volatile memory module 106. Subsequently, when the memory management circuit 302 reads the data from the rewritable non-volatile memory module 106, the memory management circuit 302 simultaneously reads the ECC code corresponding to the read data, and the ECC circuit executes the ECC procedure for the read data based on the ECC code.

Figure 4A:
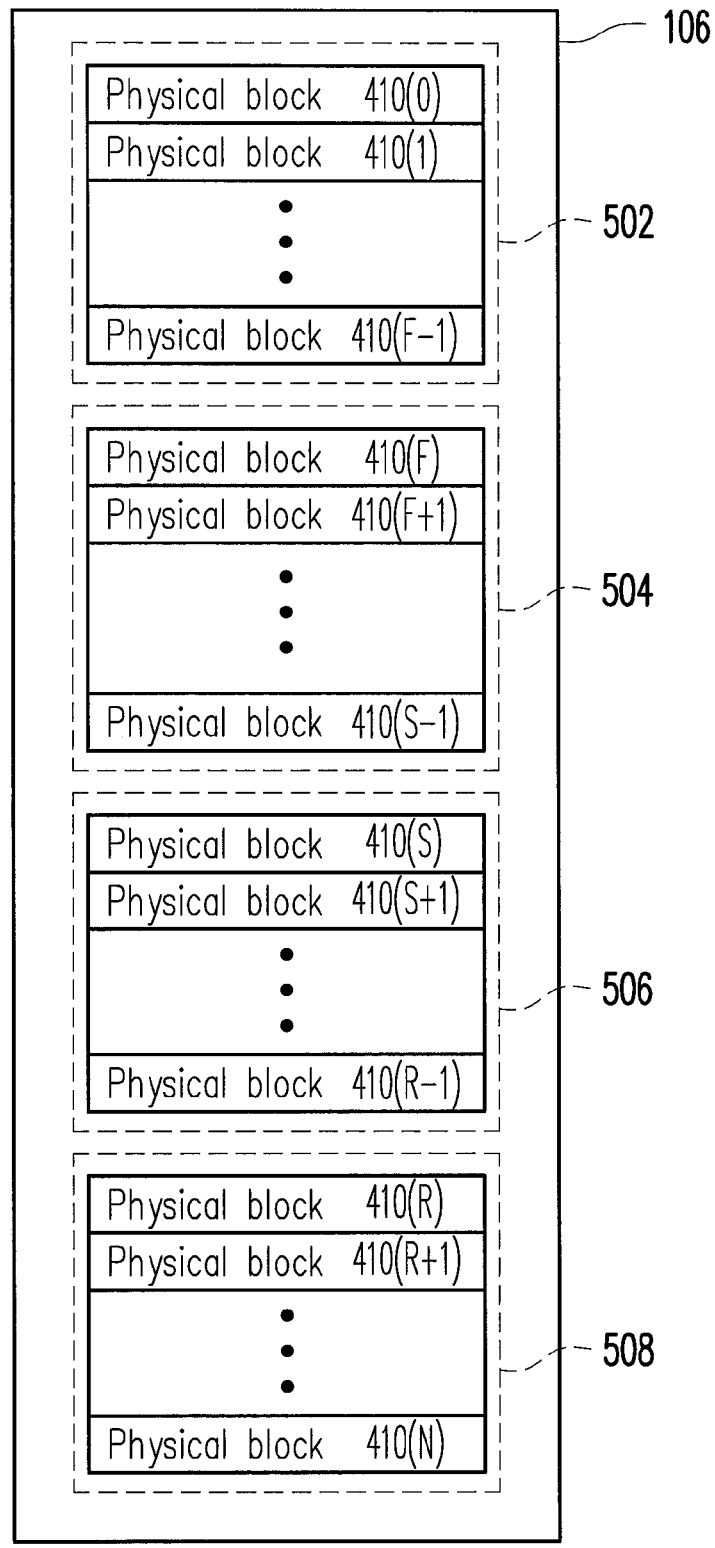
FIG. 4A and FIG. 4B are schematic diagrams of managing physical blocks in a rewritable non-volatile memory module according to an exemplary embodiment of the present invention.
Figure 4B:
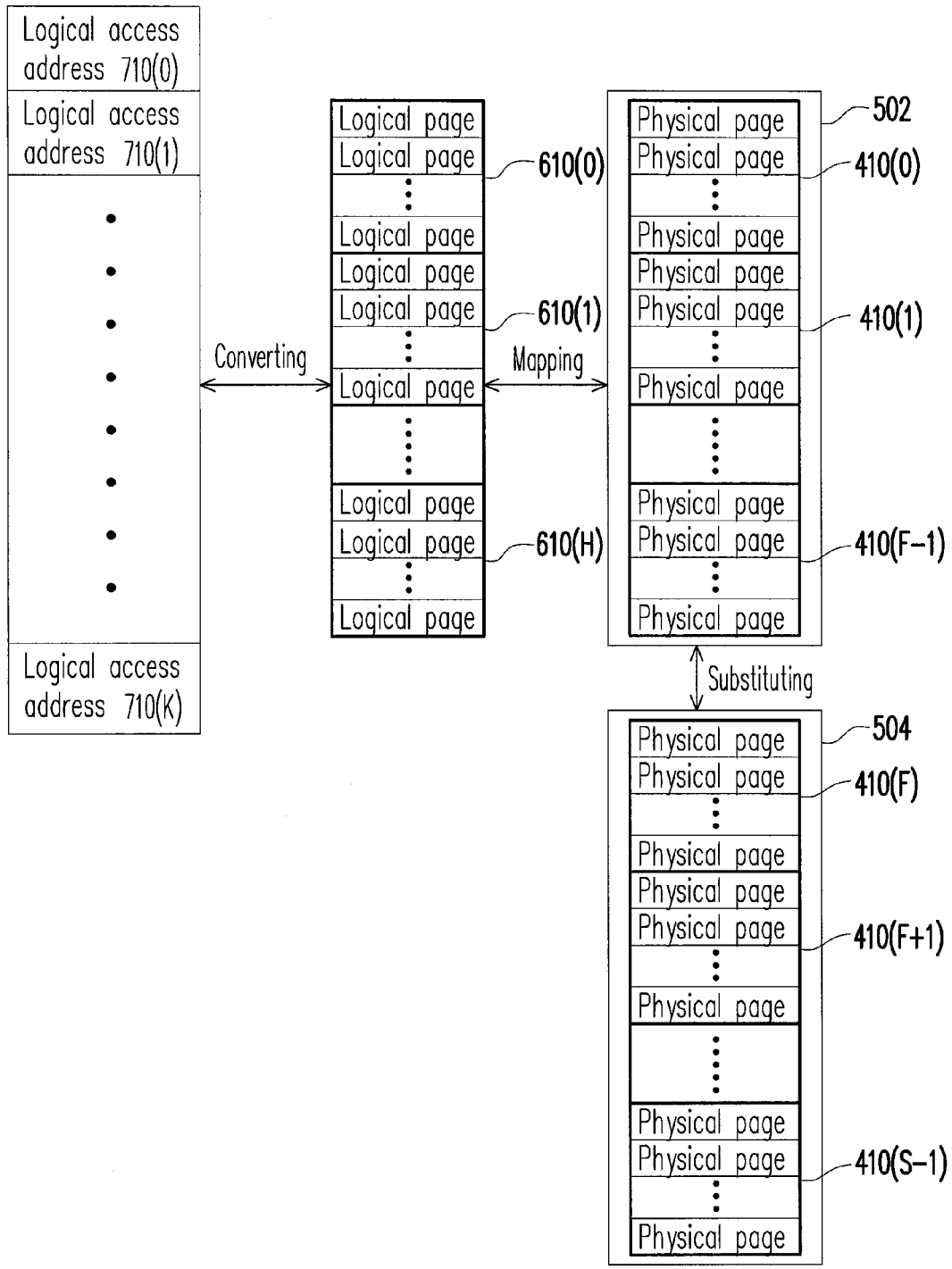

FIG. 4A and FIG. 4B are schematic diagrams of managing physical blocks in a rewritable non-volatile memory module according to an exemplary embodiment of the present invention.

With reference to FIG. 4A, the rewritable non-volatile memory module 106 has physical blocks 410(0)~410(N), and the memory management circuit 308 of the memory controller 104 logically groups the physical blocks 410(0)~410(N) into (or assigns the physical blocks 410(0)~410(N) as) a data area 502, a spare area 504, a system area 506, and a replacement area 508.

The physical blocks logically belonging to the data area 502 and the spare area 504 are used for storing data from the host system 1000. Specifically, the physical blocks (also referred to as data physical blocks) in the data area 502 are considered physical blocks already containing data, and physical blocks (also referred to as spare physical blocks) in the spare area 504 are physical blocks used for a new data writing operation. For instance, when a write command and data to be written are received from the host system 1000, the memory management circuit 302 selects a physical block from the spare area 504, organizes the data, and writes the data into the selected physical block. In addition, when a data merging procedure is to be executed on a logical block, the memory management circuit 302 selects a physical block from the spare area 504 as a new data physical block corresponding to the logical block, reads the valid data belonging to the logical block from the rewritable non-volatile memory module 106, organizes the valid data, writes the organized valid data into the new data physical block, and re-maps the logical block to the new data physical block. To be more specific, after the data merging procedure is completed, the memory management circuit 302 re-associates the data physical block storing the invalid data with the spare area 504, so as to perform a new data writing operation next time. For example, when the physical block is associated with the spare area 504, or when the physical block is selected from the spare area 504, the memory management circuit 302 erases data in the physical block. Thereby, the selected physical block from the spare area 504 is a blank physical block for writing data.

The physical blocks logically belonging to the system area 506 are used for recording system data. For instance, the system data includes the manufacturers and models of the rewritable non-volatile memory module, the number of physical blocks in the rewritable non-volatile memory modules, the number of physical pages in each physical block, and so on.

Physical blocks logically belonging to the replacement area 508 are used in a bad physical block replacement procedure for replacing damaged physical blocks. Particularly, if there are still normal physical blocks of the replacement area 508, and a physical block in the data area 502 is damaged, the memory management circuit 308 selects a normal physical block from the replacement area 508 to replace the damaged physical block.

Based on the above, during the operation of the memory storage apparatus 100, the physical blocks associated with the data area 502, the spare area 504, the system area 506, and the replacement area 508 are dynamically changed. For instance, the physical blocks used for alternatively storing data are dynamically associated with the data area 502 or the spare area 504.

It should be mentioned that the memory management circuit 302 in the present exemplary embodiment manages the rewritable non-volatile memory module 106 in units of each physical block. However, the present invention is not limited thereto, and in another exemplary embodiment, the memory management circuit 302 may also group the physical blocks into a plurality of physical units and manage the rewritable non-volatile memory module 106 in units of each physical unit. Each physical unit may be constituted by at least one physical block in the same memory die or in different memory dies, for instance.

As shown in FIG. 4B, the memory management circuit 302 configures logical blocks 610(0)-610(H) for mapping to the physical blocks of the data area 502. Each of the logical blocks has a plurality of logical pages, and the logical pages are sequentially mapped to the physical pages in the corresponding data physical block. For instance, when the memory storage apparatus 100 is formatted, the logical blocks 610(0)-610(H) are initially mapped to the physical blocks 410(0)-410(F−1) in the data area 502.

In the present exemplary embodiment, the memory management circuit 302 maintains a logical block-physical block mapping table to record the mapping relationship between the logical blocks 610(0)-610(H) and the physical blocks of the data area 502. In addition, the host system 1000 accesses data in a unit of each logical access address. For instance, a logical access address is a logical sector. When the host system 1000 accesses data, the memory management circuit 302 converts the logical access addresses 710(0)-710(K) corresponding to the memory storage apparatus 100 into addresses of the corresponding logical pages. For instance, when the host system 1000 is about to access a logical access address, the memory management circuit 302 converts the logical access address accessed by the host system 1000 into a multi-dimensional address composed of the corresponding logical block, the corresponding logical page, and the corresponding logical offset, and the memory management circuit 308 accesses data in the corresponding physical page according to the logical block-physical block mapping table. Herein, an offset is used to define a logical (or a physical) address of a logical page (or a physical page), and the offset is defined as the distance between the logical (or the physical) address and the starting address of the logical page (or the physical page), wherein the logical (or the physical) address is also referred to as a logical (or a physical) offset address.

Figure 5:
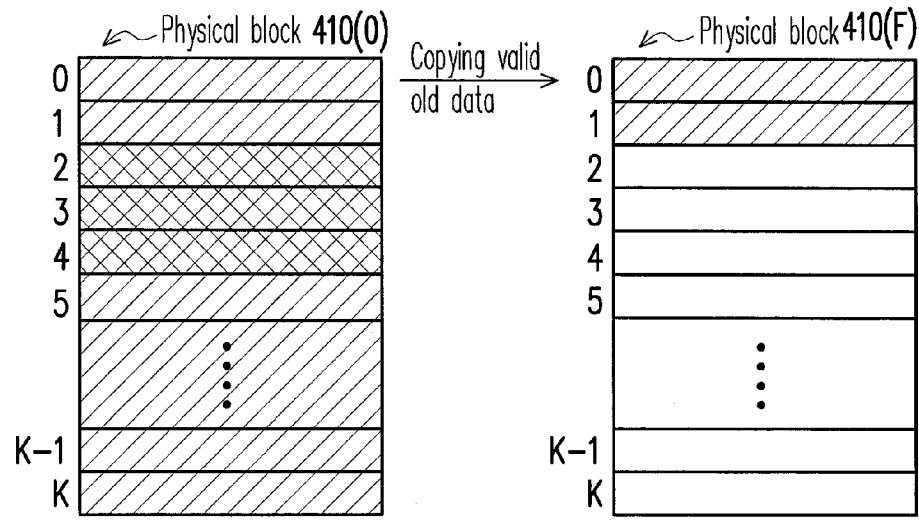
FIGS. 5-7 exemplarily illustrate an example of using child physical blocks to write updated data according to an exemplary embodiment of the present invention.
Figure 6:
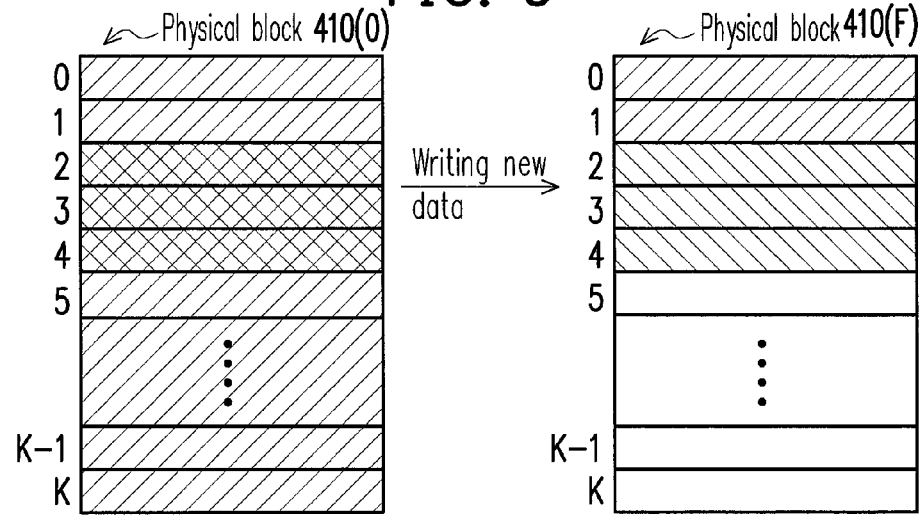
Figure 7:
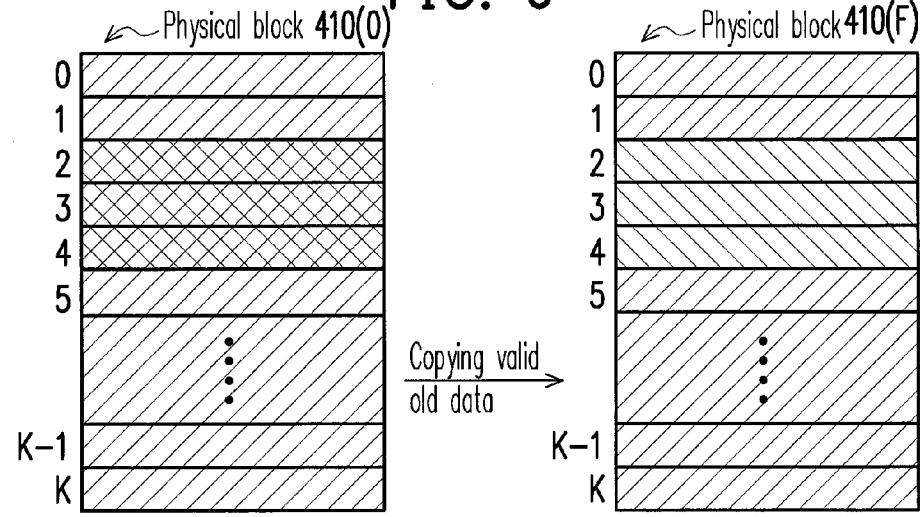

FIGS. 5-7 exemplarily illustrate an example of using child physical blocks to write updated data according to an exemplary embodiment of the present invention.

With reference to FIGS. 5-7, for instance, when the logical block 610(0) is currently mapped to the physical block 410(0) and the memory controller 104 receives a write command from the host system 1000 for writing data into the logical pages belonging to the logical block 610(0), the memory management circuit 302 identifies that the logical block 610(0) is currently mapped to the physical block 410(0) based on the logical block-physical block mapping table and selects the physical block 410(F) from the spare area 504 for substituting the physical block 410(0). However, when the new data is written into the physical block 410(F), the memory controller 104 does not instantly move all the valid data in the physical block 410(0) to the physical block 410(F) or erase the physical block 410(0). Specifically, the memory management circuit 302 reads the valid data before the physical page to be written (i.e., data in the $0^{th}$ physical page and the $1^{st}$ physical page of the physical block 410(0)) from the physical block 410(0), writes the valid data (before the physical page to be written) into the $0^{th}$ physical page and the $1^{st}$ physical page of the physical block 410(F) (as shown in FIG. 5), and writes the new data into the $2^{nd}$ physical page to the $4^{th}$ physical page of the physical block 410(F) (as shown in FIG. 6). At this time, the memory management circuit 302 completes the writing operation. Since the valid data in the physical block 410(0) may become invalid during the next operation (e.g., a write command), instantly moving all the valid data in the physical block 410(0) to the physical block 410(F) may become meaningless. Additionally, data must be written sequentially into the physical pages of the physical blocks; namely, the physical pages must be programmed sequentially according to their number. For instance, given that the $2^{nd}$ physical page is programmed and the $0^{th}$ and the $1^{st}$ physical pages are not, the $0^{th}$ and the $1^{st}$ physical pages may no longer be programmed afterwards. Hence, the memory management circuit 302 merely moves valid data before the physical page to be written (i.e., data stored in the $0^{th}$ physical page and the $1^{st}$ physical page of the physical block 410(0)) and do not move other valid data (i.e., data stored in the $5^{th}$~$K^{th}$ physical pages of the physical block 410(0)).

In the present exemplary embodiment, the operation of maintaining such a temporary relationship is referred to as opening mother-child blocks. Besides, the original physical block (e.g., the physical block 410(0)) is referred to as a "mother physical block", and the substitute physical block (e.g., the physical block 410(F)) for replacing the "mother physical block" is referred to as a "child physical block".

Thereafter, when the data of the physical blocks 410(0) and 410(F) are required to be merged, the memory management circuit 302 integrates the data in the physical blocks 410(0) and 410(F) into one single physical block, so that the efficiency of using physical blocks may be improved. Here, the operation of merging the mother-child blocks is referred to as a data merging procedure or as closing mother-child blocks.

For instance, as shown in FIG. 7, while closing the mother-child blocks, the memory management circuit 302 reads the remaining valid data from the physical block 410(0) (i.e., data stored in the 5th~Kth physical pages of the physical block 410(0)), writes the remaining valid data into the 5th~Kth physical pages of the physical block 410(F), erases the physical block 410(0), associates the erased physical block 410(0) with the spare area 504, and associates the physical block 410(F) with the data area 502. That is to say, the memory management circuit 302 re-maps the logical block 610(0) to the physical block 410(F) in the logical block-physical block mapping table.

Additionally, in the present exemplary embodiment, the memory management circuit 302 establishes a spare area physical block table (not shown) for recording the physical blocks currently associated with the spare area 504. It should be noted that the physical blocks of the spare area 504 is limited. Accordingly, during the operation of the memory storage apparatus 100, the number of the currently-opened mother-child block sets is limited as well. As such, when the memory storage apparatus 100 receives a write command from the host system 1000, and the number of the currently-opened mother-child block sets reaches the maximum value, the memory management circuit 302 must close one of the currently-opened mother-child block sets in order to execute the write command.

In addition to writing update data by using a child physical block, the memory management circuit 302 in the present exemplary embodiment further selects at least one physical block from the spare area 504 as a random physical block to write the update data.

Figure 8:
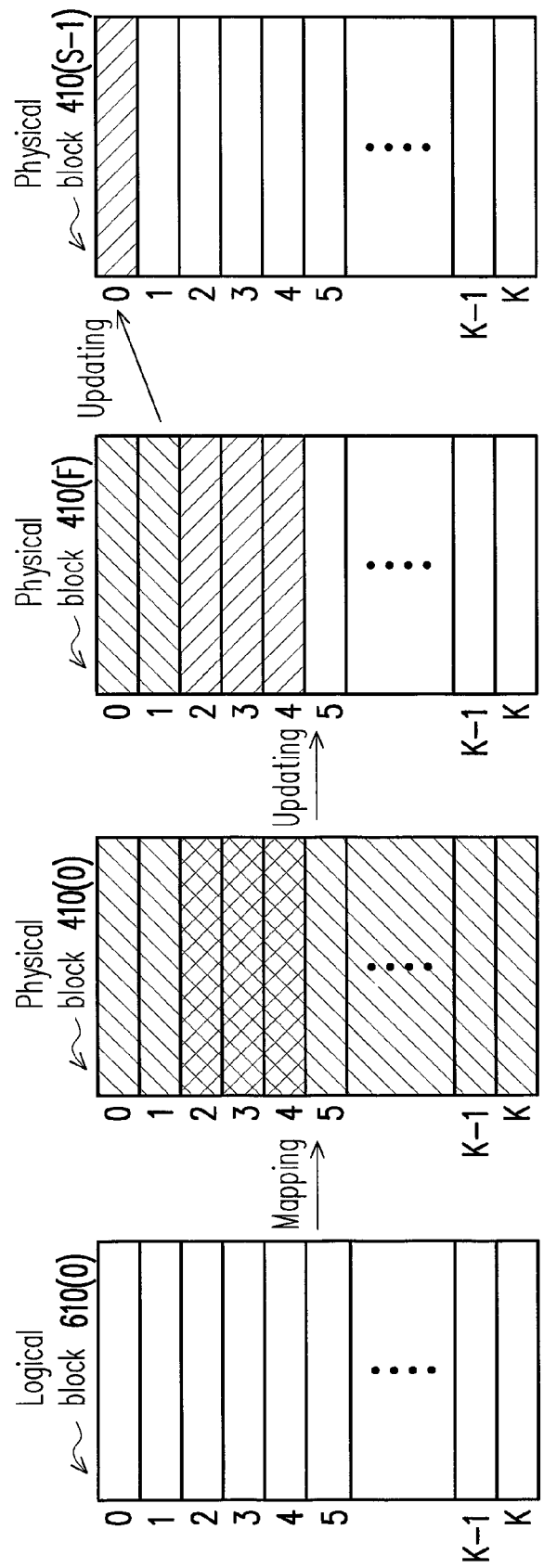
FIG. 8 schematically illustrates an example of using random physical blocks to write data according to an exemplary embodiment of the present invention.

FIG. 8 schematically illustrates an example of using random physical blocks to write data according to an exemplary embodiment of the present invention.

With reference to FIG. 8, if a physical block 410(S−1) is selected as a random physical block, and the host system 1000 is about to store update data into the 1st logical page of the logical block 610(0) in the storage state illustrated in FIG. 6, the memory management circuit 302 writes the update data into the first blank physical page of the random physical block (e.g., the 0th physical page of the physical block 410(S−1)).

In the present exemplary embodiment, when the current random physical block is full, the memory management circuit 302 selects another physical block from the spare area 504 as a new random physical block until the number of physical blocks which serve as the random physical blocks is less than a predetermined value. In particular, the number of physical blocks in the spare area 504 is limited, and therefore the number of physical blocks which act as the random physical blocks is also limited. When the number of physical blocks in the spare area 504 reaches the predetermined value, the memory management circuit 302 executes the aforementioned data merging operation to erase the random physical blocks merely containing invalid data and associate the erased physical blocks with the spare area 504. Accordingly, when the next write command is executed, the memory management circuit 302 may again select a blank physical block as a random physical block from the spare area 504.

It should be mentioned that although the data of the logical page to be updated by the host system 1000 is already written into a child physical block, as exemplarily shown in FIG. 8, the way to utilize the random physical block is not limited herein. For instance, in another exemplary embodiment of the present invention, the memory management circuit 302 may directly write the updated data from the host system 100 into a random physical block and then merge the valid data (belonging to one logical block) into a blank physical block selected from the spare area 504.

Figures 9A, 9B:
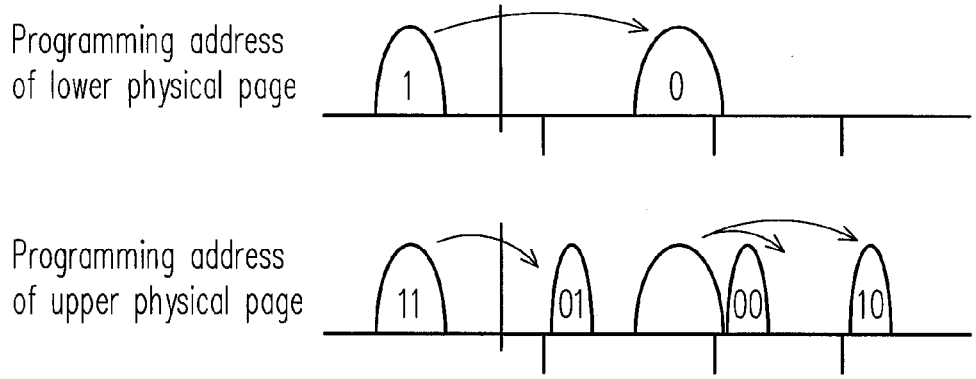
FIG. 9A is a schematic diagram illustrating 2-phase programming of an MLC NAND flash memory module according to an exemplary embodiment of the present invention.
FIG. 9B schematically illustrates physical pages of a physical block according to an exemplary embodiment of the present invention.

As stated above, the rewritable non-volatile memory module 106 is an MLC NAND flash memory module. To be more specific, each memory cell in the MLC NAND flash memory module may store 2 bits of data (i.e., "11," "10," "00," or "01"). Thereby, writing data into the MLC NAND flash memory module may be divided into two phases. The first phase lies in writing data into a lower physical page, and the second phase lies in writing data into an upper physical page, as shown in FIG. 9A. The speed of writing data into the lower physical page is faster than writing data into the upper physical page, and the upper physical page cannot be programmed unless the lower physical page is programmed. Therefore, physical pages in each physical block in the MLC NAND flash memory module may be categorized into slow physical pages (i.e., upper physical pages) and fast physical pages (i.e., lower physical pages). Compared to the upper physical pages, the lower physical pages have relatively high storage reliability. Similarly, in a TLC NAND flash memory module, each memory cell may store 3 bits of data, and the physical pages in each physical block may be categorized into slow physical pages (i.e., upper physical pages), middle-speed physical pages (i.e., middle physical pages), and fast physical pages (i.e., lower physical pages). Here, the physical pages into which the data are written in a rather rapid manner are referred to as the lower physical pages, and the physical pages (including the middle and upper physical pages) into which the data are written in a rather slow manner are collectively referred to as the upper physical pages.

FIG. 9B schematically illustrates physical pages of a physical block according to an exemplary embodiment of the present invention. In FIG. 9B, configuration of physical pages in physical blocks in a MLC NAND flash memory module is illustrated.

With reference to FIG. 9B, each physical block has 127 physical pages, and the physical pages are grouped into a plurality of physical page sets 900(0)~900(63) which are sequentially arranged. Each of the physical page sets is constituted by one upper physical page and one lower physical page.

For instance, the physical page set 900(0) (i.e., the first physical page set) is constituted by the $0^{th}$ physical page and the $4^{th}$ physical page; the physical page set 900(1) (i.e., the second physical page set) is constituted by the $1^{st}$ physical page and the $5^{th}$ physical page; the physical page set 900(2) (i.e., the third physical page set) is constituted by the $2^{nd}$ physical page and the $8^{th}$ physical page; the physical page set 900(3) (i.e., the fourth physical page set) is constituted by the $3^{rd}$ physical page and the $9^{th}$ physical page; the physical page set 900(4) (i.e., the fifth physical page set) is constituted by the $6^{th}$ physical page and the $12^{th}$ physical page; the physical page set 900(5) (i.e., the sixth physical page set) is constituted by the $7^{th}$ physical page and the $13^{th}$ physical page; the physical page set 900(6) (i.e., the seventh physical page set) is constituted by the $10^{th}$ physical page and the $16^{th}$ physical page; the physical page set 900(7) (i.e., the eighth physical page set) is constituted by the $11^{th}$ physical page and the $17^{th}$ physical page; the physical page set 900(8) (i.e., the ninth physical page set) is constituted by the $14^{th}$ physical page and the $20^{th}$ physical page, etc.

It should be mentioned that the physical pages of one physical page set are constituted by one memory cell set, and the upper physical page of the physical page set is programmed after the lower physical page of the physical page set is completely programmed, as shown in FIG. 9A. Therefore, if there is a program failure in the upper physical page, the data stored in the lower physical page may be lost.

To prevent the data loss in the lower physical page due to the program failure of the upper physical page, in the present exemplary embodiment, when the application program 1112a starts to update data in a file or write data into the file, the memory management circuit 302 identifies the next writable address (hereinafter referred to as the predetermined physical page) according to the logical block-physical block mapping table and its physical page mapping information, determines a danger distance corresponding to the predetermined physical page, selects another physical page (hereinafter referred to as the secure physical page) according to the danger distance, and writes the updated data into the secure physical page. After than, when the application program 1112a continues to transmit the subsequent updated data belonging to the same file, the memory management circuit 302 continues to write the subsequent update data into the physical page following the secure physical page. In particular, when a file starts to be updated or data start to be written into a file, the memory management circuit 302 skips some physical pages according to the corresponding danger distance and then performs the programming operation, so as to prevent loss of stored files due to program failure.

For instance, the memory management circuit 302 establishes a danger distance table to record the danger distances respectively corresponding to the physical pages. The memory management circuit 302 exemplarily records the danger distance table into the physical blocks belonging to the system area 506. When the memory storage apparatus 100 is activated, the memory management circuit 302 loads the danger distance table into the buffer memory 308 for fast inquiry.

FIG. 10 is a schematic view illustrating a danger distance table corresponding to physical pages of a physical block according to an exemplary embodiment of the present invention.

With reference to FIG. 10, the danger distance table 2000 includes a physical page number column, a secure physical page number column, and a danger distance column.

The physical page number column records the numbers assigned to the physical pages, and the secure physical page number column records the secure physical page corresponding to the physical page recorded in each physical page number column. For instance, when the $0^{th}$ physical page is to be programmed, it is likely to directly program the $0^{th}$ physical page because the physical block does not store any data; namely, program failure does not pose a negative impact on written data. When the $4^{th}$ physical page is to be programmed, for instance, the $0^{th}$ physical page may already store data. Hence, the data should be written into the $6^{th}$ physical page, such that the written data is not affected by program failure. That is to say, when data is written into the secure physical page corresponding to a physical page, data stored in a preceding physical page will definitely not be lost in case of the program failure. It should be understood that each physical page may correspond to a different secure physical page according to different rewritable non-volatile memory module, and FIG. 10 is merely exemplary and should not be construed as a limitation to the present invention.

The danger distance column records a distance between the secure physical page and the corresponding physical page recorded in the physical page number column. Here, the distance refers to the difference between the number assigned to the secure physical page and the numbers assigned to the corresponding physical page. For instance, the danger distance corresponding to the lower physical page of the first physical page set is set to be 0; the danger distance corresponding to the upper physical page of the first physical page set is set to be 2; the danger distance corresponding to the lower physical page of the second physical page set is set to be 0; the danger distance corresponding to the upper physical page of the second physical page set is set to be 1; the danger distance corresponding to the lower physical page of the third physical page set is set to be 0; the danger distance corresponding to the upper physical page of the third physical page set is set to be 2; the danger distance corresponding to the lower physical page of the fourth physical page set is set to be 0; the danger distance corresponding to the upper physical page of the fourth physical page set is set to be 1; the danger distance corresponding to the lower physical page of the fifth physical page set is set to be 0; the danger distance corresponding to the upper physical page of the fifth physical page set is set to be 2; the danger distance corresponding to the lower physical page of the sixth physical page set is set to be 3; the danger distance corresponding to the upper physical page of the sixth physical page set is set to be 1, etc.

In the present exemplary embodiment, once the application program 1112a starts to update the file stored in the memory storage apparatus 100 or write a new file into the memory storage apparatus 100, the application program 1112a transmits a secure write command to the memory storage apparatus 100. In particular, the memory management circuit 302 records a secure writing flag in the memory buffer 308 according to the secure write command and sets the secure writing flag to be in an enable state. For instance, the memory management circuit 302 sets the value of the secure writing flag to be '1' to represent that the secure writing flag is set in an enable state. However, the present invention is not limited thereto. When receiving the first write command and data (i.e., the updated data) after receiving the secure write command, the memory management circuit 302 skips the corresponding danger distance according to the danger distance table 2000 and writes the updated data into the corresponding secure physical page. Besides, the memory management circuit 302 sets the recorded secure writing flag in a disable state (e.g., the memory management circuit 302 sets the value of the secure writing flag to be '0'). If the memory management circuit 302 continues to receive the write command without receiving the secure write command, the memory management circuit 302 continues to write data into the physical page following the secure physical page. Specifically, given that the application program 1112a does not transmit the secure write command but continuously transmits the write command, it indicates that the received updated data belongs to the same file, and the host system 1000 will again write data into the file in case of program failure. Hence, the memory management circuit 302 may directly write the subsequent data into the subsequent physical page without considering the issue of loss of stored data caused by program failure.

Figure 11:
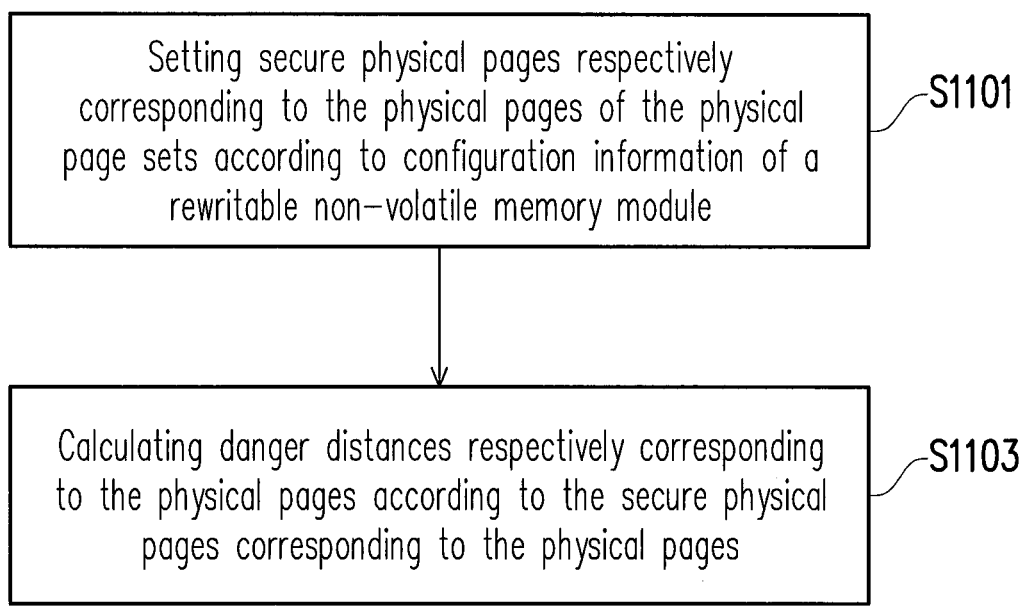
FIG. 11 is a flowchart illustrating steps of setting the danger distance according to the data writing method described in the exemplary embodiment of the present invention.

FIG. 11 is a flowchart illustrating steps of setting the danger distance according to the data writing method described in the exemplary embodiment of the present invention.

With reference to FIG. 11, in step S1101, the memory management circuit 302 sets secure physical pages respectively corresponding to the physical pages of the physical page sets according to the configuration information of the rewritable non-volatile memory module 106.

After that, in step S1103, the memory management circuit 302 calculates each danger distance corresponding to each physical page according to the secure physical pages corresponding to the physical pages. For instance, as indicated in FIG. 10, the memory management circuit 302 sets the danger distance corresponding to the lower physical page of the first physical page set to be a distance between the lower physical page of the first physical page set and the lower physical page of the first physical page set, sets the danger distance corresponding to the upper physical page of the first physical page set to be a distance between the lower physical page of the fifth physical page set and the upper physical page of the first physical page set, sets the danger distance corresponding to the lower physical page of the second physical page set to be a distance between the lower physical page of the second physical page set and the lower physical page of the second physical page set, sets the danger distance corresponding to the upper physical page of the second physical page set to be a distance between the lower physical page of the fifth physical page set and the upper physical page of the second physical page set, sets the danger distance corresponding to the lower physical page of the third physical page set to be a distance between the lower physical page of the third physical page set and the lower physical page of the third physical page set, sets the danger distance corresponding to the upper physical page of the third physical page set to be a distance between the lower physical page of the seventh physical page set and the upper physical page of the third physical page set, sets the danger distance corresponding to the lower physical page of the fourth physical page set to be a distance between the lower physical page of the fourth physical page set and the lower physical page of the fourth physical page set, sets the danger distance corresponding to the upper physical page of the fourth physical page set to be a distance between the lower physical page of the seventh physical page set and the upper physical page of the fourth physical page set, sets the danger distance corresponding to the lower physical page of the fifth physical page set to be a distance between the lower physical page of the fifth physical page set and the lower physical page of the fifth physical page set, sets the danger distance corresponding to the upper physical page of the fifth physical page set to be a distance between the lower physical page of the ninth physical page set and the upper physical page of the fifth physical page set, sets the danger distance corresponding to the lower physical page of the sixth physical page set to be a distance between the lower physical page of the seventh physical page set and the lower physical page of the sixth physical page set, sets the danger distance corresponding to the upper physical page of the sixth physical page set to be a distance between the lower physical page of the ninth physical page set and the upper physical page of the sixth physical page set, etc.

Figure 12:
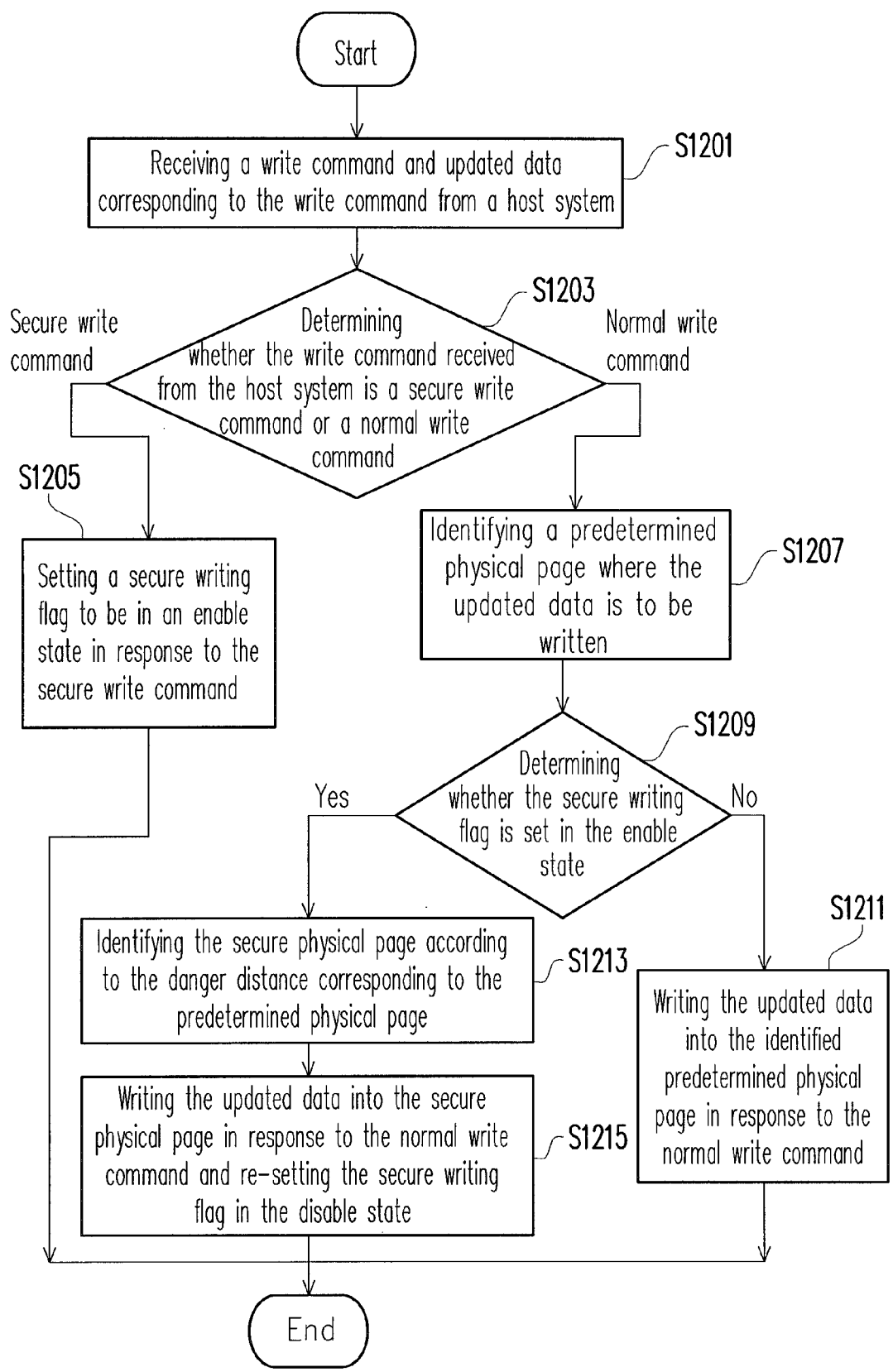
FIG. 12 is a flowchart illustrating steps of executing a write command according to the data writing method described in the exemplary embodiment of the present invention.

FIG. 12 is a flowchart illustrating steps of executing a write command according to the data writing method described in the exemplary embodiment of the present invention.

With reference to FIG. 12, in step S1201, the memory management circuit 302 receives a write command and updated data corresponding to the write command from the host system 1000, and in step S1203, the memory management circuit 302 determines whether the write command received from the host system 1000 is a secure write command or a normal write command.

If the write command received from the host system 1000 is a secure write command, in step S1205, the memory management circuit 302 sets a secure writing flag in an enable state in response to the secure write command.

If the write command received from the host system 1000 is a normal write command, in step S1207, the memory management circuit 302 identifies the predetermined physical page where the updated data is to be written.

Specifically, in step S1207, the memory management circuit 302 identifies the target physical block where the updated data is to be written according to the logical block-physical block mapping table. Herein, the target physical block may be a child physical block shown in FIG. 5 to FIG. 7 or a random physical block shown in FIG. 8. According to the physical page mapping information of the physical block, the memory management circuit 302 identifies the physical page (i.e., the predetermined physical page) where the updated data can be written.

After that, in step S1209, the memory management circuit 302 determines whether the secure writing flag is set in the enable state.

If the secure writing flag is not set in the enable state (i.e., set in the disable state), in step S1211, the memory management circuit 302 writes the updated data into the identified predetermined physical page in response to the normal write command.

If the secure writing flag is set in the enable state, in step S1213, the memory management circuit 302 identifies the secure physical page according to the danger distance corresponding to the predetermined physical page. For instance, the memory management circuit 302 may obtain the page number of the secure physical page by adding the page number of the predetermined physical page to the danger distance corresponding to the predetermined physical page.

Thereafter, in step S1215, the memory management circuit 302 writes the updated data into the secure physical page in response to the normal write command and re-sets the secure writing flag in the disable state.

In light of the foregoing, according to the data writing method, the memory controller, and the memory storage apparatus described in the exemplary embodiments of the present invention, when data starts to be written into a file or a file starts to be updated, a secure physical page is determined according to the danger distance corresponding to the physical page where the data is planned to be written, and the data belonging to the file starts to be written into the secure physical page first. Thereby, loss of data stored in the physical block and belonging to other files can be prevented.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

What is claimed is:

1. A data writing method for writing data into a physical block of a rewritable non-volatile memory module, wherein the physical block has a plurality of physical page sets, each of the physical page sets has a plurality of physical pages, the physical pages comprises a lower physical page and an upper physical page, a reliability of the lower physical page is better than a reliability of the upper physical page, and the data writing method comprises:

setting danger distance respectively corresponding to each of the physical pages of the physical page sets;

receiving a secure write command and setting a secure writing flag in an enable state in response to the secure write command;

receiving a write command and new data corresponding to the write command;

identifying a predetermined physical page of the physical pages of the physical page sets;

determining whether the secure writing flag is set in the enable state;

if the secure writing flag is set in the enable state, writing the new data into a secure physical page of the physical pages of the physical page sets in response to the write command and re-setting the secure writing flag in a disable state, wherein a distance between the secure physical page and the predetermined physical page in the physical block is equal to the danger distance corresponding to the predetermined physical page; and if the secure writing flag is not set in the enable state, writing the new data into the predetermined physical page of the physical pages in response to the write command.

2. The data writing method as recited in claim 1, wherein the physical page sets comprise a first physical page set, a second physical page set, a third physical page set, a fourth physical page set, a fifth physical page set, a sixth physical page set, and a seventh physical page set, wherein the step of setting the danger distance respectively corresponding to each of the physical pages of the physical page sets comprises:

setting the danger distance corresponding to the lower physical page of the first physical page set to be a distance between the lower physical page of the first physical page set and the lower physical page of the first physical page set;

setting the danger distance corresponding to the upper physical page of the first physical page set to be a distance between the lower physical page of the fifth physical page set and the upper physical page of the first physical page set;

setting the danger distance corresponding to the lower physical page of the second physical page set to be a distance between the lower physical page of the second physical page set and the lower physical page of the second physical page set;

setting the danger distance corresponding to the upper physical page of the second physical page set to be a distance between the lower physical page of the fifth physical page set and the upper physical page of the second physical page set;

setting the danger distance corresponding to the lower physical page of the third physical page set to be a distance between the lower physical page of the third physical page set and the lower physical page of the third physical page set;

setting the danger distance corresponding to the upper physical page of the third physical page set to be a distance between the lower physical page of the seventh physical page set and the upper physical page of the third physical page set;

setting the danger distance corresponding to the lower physical page of the fourth physical page set to be a distance between the lower physical page of the fourth physical page set and the lower physical page of the fourth physical page set; and setting the danger distance corresponding to the upper physical page of the fourth physical page set to be a distance between the lower physical page of the seventh physical page set and the upper physical page of the fourth physical page set.

3. The data writing method as recited in claim 1, wherein the physical page sets comprise a fifth physical page set, a sixth physical page set, a seventh physical page set, an eighth physical page set, and a ninth physical page set, wherein the step of setting the danger distance respectively corresponding each of the physical pages of the physical page sets comprises:

setting the danger distance corresponding to the lower physical page of the fifth physical page set to be a distance between the lower physical page of the fifth physical page set and the lower physical page of the fifth physical page set;

setting the danger distance corresponding to the upper physical page of the fifth physical page set to be a distance between the lower physical page of the ninth physical page set and the upper physical page of the fifth physical page set;

setting the danger distance corresponding to the lower physical page of the sixth physical page set to be a distance between the lower physical page of the seventh physical page set and the lower physical page of the sixth physical page set; and setting the danger distance corresponding to the upper physical page of the sixth physical page set to be a distance between the lower physical page of the ninth physical page set and the upper physical page of the sixth physical page set.

4. The data writing method as recited in claim 1, wherein the physical page sets comprise a first physical page set, a second physical page set, a third physical page set, and a fourth physical page set, wherein the step of setting the danger distance respectively corresponding to each of the physical pages of the physical page sets comprises:

setting the danger distance corresponding to the lower physical page of the first physical page set to be 0;

setting the danger distance corresponding to the upper physical page of the first physical page set to be 2;

setting the danger distance corresponding to the lower physical page of the second physical page set to be 0;

setting the danger distance corresponding to the upper physical page of the second physical page set to be 1;

setting the danger distance corresponding to the lower physical page of the third physical page set to be 0;

setting the danger distance corresponding to the upper physical page of the third physical page set to be 2;

setting the danger distance corresponding to the lower physical page of the fourth physical page set to be 0; and setting the danger distance corresponding to the upper physical page of the fourth physical page set to be 1.

5. The data writing method as recited in claim 4, wherein each of the physical page sets further comprises a fifth physical page set and a sixth physical page set, wherein the step of setting the danger distance respectively corresponding to each of the physical pages of each of the physical page sets comprises:

setting the danger distance corresponding to the lower physical page of the fifth physical page set to be 0;

setting the danger distance corresponding to the upper physical page of the fifth physical page set to be 2;

setting the danger distance corresponding to the lower physical page of the sixth physical page set to be 3; and setting the danger distance corresponding to the upper physical page of the sixth physical page set to be 1.

6. The data writing method as recited in claim 1 further comprising:

establishing a danger distance table and recording the danger distance respectively corresponding to each of the physical pages of the physical page sets.

7. The data writing method as recited in claim 1, wherein a speed of writing data into the lower physical page is faster than a speed of writing data into the upper physical page.

8. A memory controller for controlling a rewritable non-volatile memory module, wherein the rewritable non-volatile memory module has a plurality of physical blocks, each of the physical blocks has a plurality of physical page sets, each of the physical page sets comprises a plurality of physical pages, the physical pages comprises a lower physical page and an upper physical page, a reliability of the lower physical page is better than a reliability of the upper physical page, and the memory controller comprises:

a host interface configured to couple to a host system;

a memory interface configured to couple to the rewritable non-volatile memory module; and a memory management circuit coupled to the host interface and the memory interface and configured to set danger distance corresponding to each of the physical pages of the physical page sets of the physical blocks, wherein the memory management circuit is further configured to receive a secure write command and set a secure writing flag in an enable state in response to the secure write command, wherein the memory management circuit is further configured to receive a write command and new data corresponding to the write command and identify a predetermined physical page among the physical pages of the physical page sets of a target physical block among the physical blocks, wherein the memory management circuit is further configured to determine whether the secure writing flag is set in the enable state, wherein if the secure writing flag is set in the enable state, the memory management circuit is further configured to write the new data into a secure physical page of the physical pages of the physical page sets in the target physical block in response to the write command and re-set the secure writing flag in a disable state, wherein if the secure writing flag is not set in the enable state, the memory management circuit is further configured to write the new data into the predetermined physical page in response to the write command, wherein a distance between the secure physical page and the predetermined physical page in the target physical block is equal to the danger distance corresponding to the predetermined physical page.

9. The memory controller as recited in claim 8, wherein the physical page sets of the target physical block comprise a first physical page set, a second physical page set, a third physical page set, a fourth physical page set, a fifth physical page set, a sixth physical page set, and a seventh physical page set, wherein the memory management circuit is further configured to set the danger distance corresponding to the lower physical page of the first physical page set to be a distance between the lower physical page of the first physical page set and the lower physical page of the first physical page set, wherein the memory management circuit is further configured to set the danger distance corresponding to the upper physical page of the first physical page set to be a distance between the lower physical page of the fifth physical page set and the upper physical page of the first physical page set, wherein the memory management circuit is further configured to set the danger distance corresponding to the lower physical page of the second physical page set to be a distance between the lower physical page of the second physical page set and the lower physical page of the second physical page set, wherein the memory management circuit is further configured to set the danger distance corresponding to the upper physical page of the second physical page set to be a distance between the lower physical page of the fifth physical page set and the upper physical page of the second physical page set, wherein the memory management circuit is further configured to set the danger distance corresponding to the lower physical page of the third physical page set to be a distance between the lower physical page of the third physical page set and the lower physical page of the third physical page set, wherein the memory management circuit is further configured to set the danger distance corresponding to the upper physical page of the third physical page set to be a distance between the lower physical page of the seventh physical page set and the upper physical page of the third physical page set, wherein the memory management circuit is further configured to set the danger distance corresponding to the lower physical page of the fourth physical page set to be a distance between the lower physical page of the fourth physical page set and the lower physical page of the fourth physical page set, wherein the memory management circuit is further configured to set the danger distance corresponding to the upper physical page of the fourth physical page set to be a distance between the lower physical page of the seventh physical page set and the upper physical page of the fourth physical page set.

10. The memory controller as recited in claim 8, wherein the physical page sets of the target physical block comprise a fifth physical page set, a sixth physical page set, a seventh physical page set, an eighth physical page set, and a ninth physical page set, wherein the memory management circuit is further configured to set the danger distance corresponding to the lower physical page of the fifth physical page set to be a distance between the lower physical page of the fifth physical page set and the lower physical page of the fifth physical page set, wherein the memory management circuit is further configured to set the danger distance corresponding to the upper physical page of the fifth physical page set to be a distance between the lower physical page of the ninth physical page set and the upper physical page of the fifth physical page set, wherein the memory management circuit is further configured to set the danger distance corresponding to the lower physical page of the sixth physical page set to be a distance between the lower physical page of the seventh physical page set and the lower physical page of the sixth physical page set, wherein the memory management circuit is further configured to set the danger distance corresponding to the upper physical page of the sixth physical page set to be a distance between the lower physical page of the ninth physical page set and the upper physical page of the sixth physical page set.

11. The memory controller as recited in claim 8, wherein the physical page sets of the target physical block comprise a first physical page set, a second physical page set, a third physical page set, and a fourth physical page set, wherein the memory management circuit is further configured to set the danger distance corresponding to the lower physical page of the first physical page set to be 0, set the danger distance corresponding to the upper physical page of the first physical page set to be 2, set the danger distance corresponding to the lower physical page of the second physical page set to be 0, set the danger distance corresponding to the upper physical page of the second physical page set to be 1, set the danger distance corresponding to the lower physical page of the third physical page set to be 0, set the danger distance corresponding to the upper physical page of the third physical page set to be 2, set the danger distance corresponding to the lower physical page of the fourth physical page set to be 0, and set the danger distance corresponding to the upper physical page of the fourth physical page set to be 1.

12. The memory controller as recited in claim 11, wherein each of the physical page sets further comprises a fifth physical page set and a sixth physical page set, wherein the memory management circuit is further configured to set the danger distance corresponding to the lower physical page of the fifth physical page set to be 0, set the danger distance corresponding to the upper physical page of the fifth physical page set to be 2, set the danger distance corresponding to the lower physical page of the sixth physical page set to be 3, and set the danger distance corresponding to the upper physical page of the sixth physical page set to be 1.

13. The memory controller as recited in claim 8, wherein the memory management circuit is further configured to establish a danger distance table and record the danger distance corresponding to each of the physical pages of the physical page sets of the physical blocks in the danger distance table.

14. A memory storage apparatus comprising:
a rewritable non-volatile memory module having a plurality of physical blocks, wherein each of the physical blocks has a plurality of physical page sets, each of the physical page sets comprises a plurality of physical pages, the physical pages comprises a lower physical page and an upper physical page, and a reliability of the lower physical page is better than a reliability of the upper physical page;
a connector configured to couple to a host system; and
a memory controller coupled to the rewritable non-volatile memory module and the connector and configured to set danger distance respectively corresponding to each of the physical pages of the physical page sets of the physical blocks, wherein the memory controller is further configured to receive a secure write command and set a secure writing flag in an enable state in response to the secure write command, wherein the memory controller is further configured to receive a write command and new data corresponding to the write command and identify a predetermined physical page among the physical pages of the physical page sets of a target physical block among the physical blocks, wherein the memory controller is further configured to determine whether the secure writing flag is set in the enable state, wherein if the secure writing flag is set in the enable state, the memory controller is further configured to write the new data into a secure physical page of the physical pages of the physical page sets in the target physical block in response to the write command and re-set the secure writing flag in a disable state, wherein if the secure writing flag is not set in the enable state, the memory controller writes the new data into the predetermined physical page in response to the write command, wherein a distance between the secure physical page and the predetermined physical page in the target physical block is equal to the danger distance corresponding to the predetermined physical page.

15. The memory storage apparatus as recited in claim 14, wherein the physical page sets of the target physical block comprise a first physical page set, a second physical page set, a third physical page set, a fourth physical page set, a fifth physical page set, a sixth physical page set, and a seventh physical page set, wherein the memory controller is further configured to set the danger distance corresponding to the lower physical page of the first physical page set to be a distance between the lower physical page of the first physical page set and the lower physical page of the first physical page set;

wherein the memory controller is further configured to set the danger distance corresponding to the upper physical page of the first physical page set to be a distance between the lower physical page of the fifth physical page set and the upper physical page of the first physical page set, wherein the memory controller is further configured to set the danger distance corresponding to the lower physical page of the second physical page set to be a distance between the lower physical page of the second physical page set and the lower physical page of the second physical page set, wherein the memory controller is further configured to set the danger distance corresponding to the upper physical page of the second physical page set to be a distance between the lower physical page of the fifth physical page set and the upper physical page of the second physical page set, wherein the memory controller is further configured to set the danger distance corresponding to the lower physical page of the third physical page set to be a distance between the lower physical page of the third physical page set and the lower physical page of the third physical page set, wherein the memory controller is further configured to set the danger distance corresponding to the upper physical page of the third physical page set to be a distance between the lower physical page of the seventh physical page set and the upper physical page of the third physical page set, wherein the memory controller is further configured to set the danger distance corresponding to the lower physical page of the fourth physical page set to be a distance between the lower physical page of the fourth physical page set and the lower physical page of the fourth physical page set, wherein the memory controller is further configured to set the danger distance corresponding to the upper physical page of the fourth physical page set to be a distance between the lower physical page of the seventh physical page set and the upper physical page of the fourth physical page set.

16. The memory storage apparatus as recited in claim 14, wherein the physical page sets of the target physical block comprise a fifth physical page set, a sixth physical page set, a seventh physical page set, an eighth physical page set, and a ninth physical page set, wherein the memory controller is further configured to set the danger distance corresponding to the lower physical page of the fifth physical page set to be a distance between the lower physical page of the fifth physical page set and the lower physical page of the fifth physical page set, wherein the memory controller is further configured to set the danger distance corresponding to the upper physical page of the fifth physical page set to be a distance between the lower physical page of the ninth physical page set and the upper physical page of the fifth physical page set, wherein the memory controller is further configured to set the danger distance corresponding to the lower physical page of the sixth physical page set to be a distance between the lower physical page of the seventh physical page set and the lower physical page of the sixth physical page set, wherein the memory controller is further configured to set the danger distance corresponding to the upper physical page of the sixth physical page set to be a distance between the lower physical page of the ninth physical page set and the upper physical page of the sixth physical page set.

17. The memory storage apparatus as recited in claim 14, wherein the physical page sets of the target physical block comprise a first physical page set, a second physical page set, a third physical page set, and a fourth physical page set, wherein the memory controller is further configured to set the danger distance corresponding to the lower physical page of the first physical page set to be 0, set the danger distance corresponding to the upper physical page of the first physical page set to be 2, set the danger distance corresponding to the lower physical page of the second physical page set to be 0, set the danger distance corresponding to the upper physical page of the second physical page set to be 1, set the danger distance corresponding to the lower physical page of the third physical page set to be 0, set the danger distance corresponding to the upper physical page of the third physical page set to be 2, set the danger distance corresponding to the lower physical page of the fourth physical page set to be 0, and set the danger distance corresponding to the upper physical page of the fourth physical page set to be 1.

18. The memory storage apparatus as recited in claim 17, wherein each of the physical page sets further comprises a fifth physical page set and a sixth physical page set,
> wherein the memory controller is further configured to set the danger distance corresponding to the lower physical page of the fifth physical page set to be 0, set the danger distance corresponding to the upper physical page of the fifth physical page set to be 2, set the danger distance corresponding to the lower physical page of the sixth physical page set to be 3, and set the danger distance corresponding to the upper physical page of the sixth physical page set to be 1.

19. The memory storage apparatus as recited in claim 14, wherein the memory controller is further configured to establish a danger distance table and record the danger distance corresponding to each of the physical pages of the physical page sets of the physical blocks in the danger distance table.

20. The memory storage apparatus as recited in claim 14, wherein a speed of writing data into the lower physical page is faster than a speed of writing data into the upper physical page.

\* \* \* \* \*